S. A. HARRISON.
AUTOMOBILE AND VEHICLE TIRE.
APPLICATION FILED SEPT. 22, 1911.
1,057,734. Patented Apr. 1, 1913.
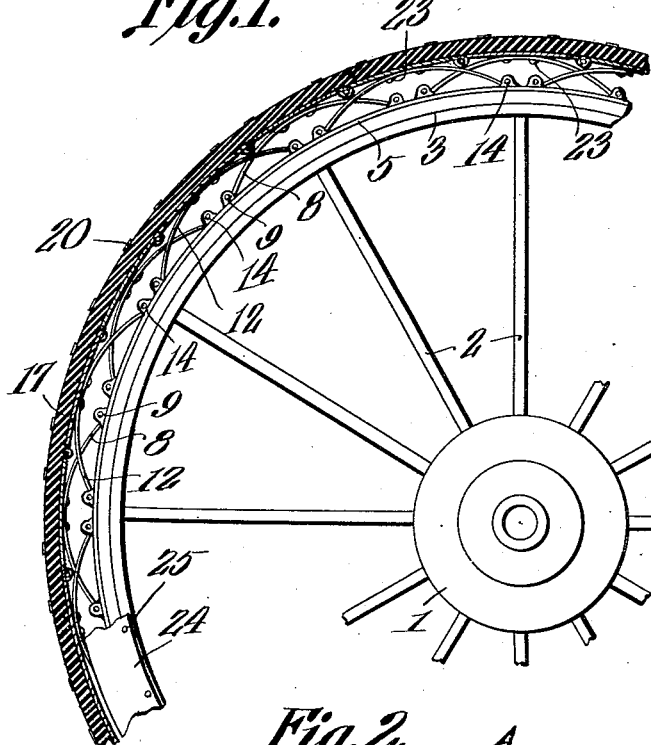
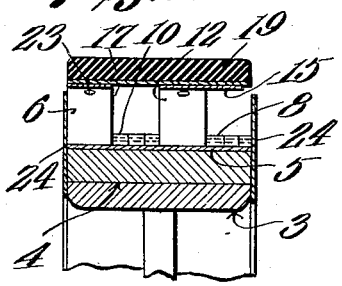
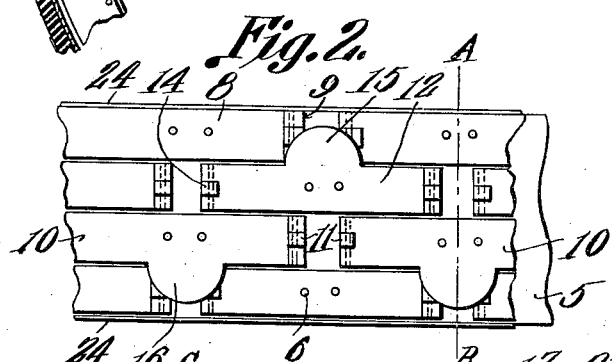
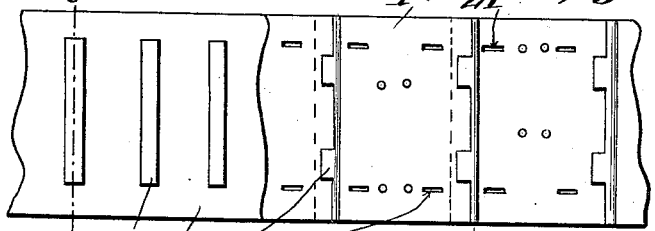
Samuel A. Harrison, Inventor

UNITED STATES PATENT OFFICE.

SAMUEL A. HARRISON, OF CHICAGO, ILLINOIS.

AUTOMOBILE AND VEHICLE TIRE.

1,057,734.  Specification of Letters Patent.  Patented Apr. 1, 1913.

Application filed September 22, 1911. Serial No. 650,784.

*To all whom it may concern:*

Be it known that I, SAMUEL A. HARRISON, a citizen of the United States, residing at Chicago, in the county of Cook and State of Illinois, have invented a new and useful Automobile and Vehicle Tire, of which the following is a specification.

The objects of the present invention are, generally, to provide a spring tire structure which will obviate the danger of puncture; to provide a tire which will ride as smoothly as an inflated tire; and to provide a tire which will prevent skidding.

Specifically, the objects of the invention are to provide a novel spring construction adapted to support a tread; and to provide a tread of novel form, which will be durable, and at the same time prevent skidding.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 is a fragmental sectional elevation of a wheel equipped with the device of my invention; Fig. 2 is a top plan of a portion of the wheel, showing the relation between the several sets of springs, the tread portion of the structure being removed; Fig. 3 is an elevation of the tread portion of the device, parts being broken away; Fig. 4 is a section taken on the line A—B of Fig. 2, the wheel rim and the tread appearing as added details; Fig. 5 is a section on the line C—D of Fig. 3; and Fig. 6 is a fragmental elevation showing a modified form of tread, parts being sectioned. Fig. 7 is a sectional detail showing the hinged connection between the plates which constitute a portion of the tread of the wheel.

In the accompanying drawings, the numeral 1 denotes the hub, the numeral 2 denotes the spokes, and the numeral 3 denotes the felly. The felly 3 may be of any desired construction. In Fig. 4, the felly is shown as comprising two layers, as indicated at 4, but broadly speaking, the construction of the felly is of no particular consequence.

The felly 3 supports a rim 5, preferably fashioned from iron.

The invention further includes several sets of springs, these springs being ordinarily of steel. A set of bowed edge springs 6 are secured at their ends to the rim 5, as shown at 7, the springs 6 extending circumferentially of the wheel. Another set of bowed edge springs 8 are provided, the springs 8 being secured at their ends to the rim 5, as shown at 9, these bowed springs 8 extending circumferentially of the wheel. Extended circumferentially of the rim 5 and located between the springs 8 and 6, adjacent the springs 6, is a set of bowed intermediate springs 10, extended circumferentially of the rim, the springs 10 being secured to the rim 5 as shown at 11. Another set of intermediate bowed springs 12 extend circumferentially of the rim, the springs 12 being located between the springs 10 and 8, the springs 12 being secured at their ends to the rim 5, as shown at 14. It is to be noted that the ends of the springs 6 alternate, circumferentially of the wheel, with the ends of the springs 8. Likewise, the ends of the springs 12 alternate, circumferentially of the wheel, with the ends of the springs 10. The ends of the springs 12 are alined with the ends of the springs 6, and alternate with the ends of the springs 8. The ends of the springs 10 alternate with the ends of the springs 6, and are alined with the ends of the springs 8. The springs 12 are provided at their crowns, with laterally projecting tongues 15, overhanging the ends of the springs 8; and the springs 10 are provided at their crowns, with lateral tongues 16, overhanging the ends of the springs 6.

A flexible tread is provided, the same consisting of a series of plates 17, hingedly connected, as shown at 18. Securing elements, denoted generally by the numeral 23 serve to unite the plates 17 with the springs, adjacent the crowns of the springs, and the plates 17 are supported by the crowns of all of the springs, and by the tongues 15 and 16 of the springs 12 and 10, respectively. It may be noted at this point, that the tongues 15 and 16 serve to support the plates 17 adjacent the lateral edges of the rim, and at points where the plates are unsupported by the crowns of the springs 8 and 6.

The plates 17 support the tire proper.

preferably fashioned from rubber. Staples 20 are extended through the tire 19, and through openings 21 in the plates 17, the ends of the staples 20 being clenched upon the lower surfaces of the plates 17, as indicated by the reference numeral 22 in Fig. 5.

The several springs hereinbefore described, are protected laterally, by side plates 24, fashioned from any desired material, the plates 24 being secured to the felly 3, as indicated at 25. The staples 20 serve not only to hold the tire 19 assembled with the plates 17 but, at the same time, constitute anti-slipping elements. It is to be noted that the flexible tread, comprising the plates 17 and the tire 19 is thoroughly and efficiently supported by the several springs hereinbefore described, the construction being such, owing to the alternate positioning of the ends of the springs, and owing to the presence of the tongues 15 and 16, that the tread will be adequately supported at a multiplicity of points, even though the springs are of arched configuration. If desired, as shown in Fig. 6, the plates 17', corresponding to the plates 17, may be equipped with transverse traction cleats 100, in place of the tire 19.

Having thus described the invention, what is claimed is:—

A device of the class described comprising a rim; sets of bowed edge springs extended circumferentially of the rim and secured at their ends to the rim, the ends of the springs of one set alternating with the ends of the springs of the other set circumferentially of the rim; sets of bowed intermediate springs extended circumferentially of the rim between the sets of edge springs and secured at their ends to the rim, the ends of the springs of one intermediate set alternating with the ends of the springs of the other intermediate set, the ends of the springs of each intermediate set alternating with the ends of the springs of one edge set; the crowns of the springs of the intermediate sets only, being provided with lateral tongues projecting in opposite directions in the respective sets and overhanging the ends of the edge springs, the tongues being spaced from the edge springs; and a tread supported by the edge springs and by the intermediate springs and by the tongues of the intermediate springs.

In testimony that I claim the foregoing as my own, I have hereto affixed my signature in the presence of two witnesses.

SAMUEL A. HARRISON.

Witnesses:
O. V. STOOKEY,
IRENE PARKER.

---

Copies of this patent may be obtained for five cents each, by addressing the "Commissioner of Patents, Washington, D. C."